United States Patent
Li et al.

(10) Patent No.: US 12,015,756 B2
(45) Date of Patent: Jun. 18, 2024

(54) MULTI-VIEW VIDEO PROCESSING METHOD AND APPARATUS

(71) Applicant: ZTE Corporation, Guangdong (CN)

(72) Inventors: Qiuting Li, Guangdong (CN); Cheng Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 157 days.

(21) Appl. No.: 17/752,828

(22) Filed: May 24, 2022

(65) Prior Publication Data
US 2022/0286659 A1 Sep. 8, 2022

Related U.S. Application Data

(63) Continuation of application No. PCT/CN2019/122095, filed on Nov. 29, 2019.

(51) Int. Cl.
*H04N 13/156* (2018.01)
*H04N 13/128* (2018.01)
*H04N 13/00* (2018.01)

(52) U.S. Cl.
CPC ......... *H04N 13/156* (2018.05); *H04N 13/128* (2018.05); *H04N 2013/0081* (2013.01)

(58) Field of Classification Search
CPC .. H04N 13/117; H04N 13/128; H04N 13/156; H04N 13/161; H04N 13/189; H04N 13/194; H04N 13/279; H04N 19/597; H04N 2013/0081; H04N 21/21805; H04N 21/44218; H04N 21/8153
USPC .................................................. 375/240.12
See application file for complete search history.

(56) References Cited

U.S. PATENT DOCUMENTS

| | | |
|---|---|---|
| 10,891,784 B2 | 1/2021 | Dore et al. |
| 11,070,893 B2 | 7/2021 | Denoual et al. |
| 11,606,576 B2 * | 3/2023 | Yip ........................ H04N 19/70 |

(Continued)

FOREIGN PATENT DOCUMENTS

| | | |
|---|---|---|
| CN | 110463210 A | 11/2019 |
| JP | 2016-506693 A | 3/2016 |

(Continued)

OTHER PUBLICATIONS

Japanese office action issued in JP Patent Application No. 2022-531493, dated Sep. 4, 2023, 25 pages. English translation included.

(Continued)

*Primary Examiner* — Behrooz M Senfi
(74) *Attorney, Agent, or Firm* — Perkins Coie LLP

(57) ABSTRACT

Methods, apparatus, and systems for effectively reducing media content transmissions and efficiently rendering immersive media contents are disclosed. In one example aspect, a method includes requesting, by a user, media files from a server according to the current viewing position and viewing direction of the user, receiving, by the user, the media files from the server according to the current viewing position and the viewing direction of the user, extracting a patch of an atlas, and synthesizing the visual content in the current window area of the user, and obtaining, by the user, three-dimensional stereoscopic video content according to the current viewing position and viewing direction of the user.

20 Claims, 7 Drawing Sheets

(56) References Cited

U.S. PATENT DOCUMENTS

| | | | | |
|---|---|---|---|---|
| 2012/0016917 A1* | 1/2012 | Priddle | ............... | H04N 5/91 |
| | | | | 707/E17.143 |
| 2014/0192151 A1* | 7/2014 | Wang | ............... | H04N 13/161 |
| | | | | 348/43 |
| 2016/0232939 A1 | 8/2016 | Malamal Vadakital et al. | | |
| 2016/0373771 A1 | 12/2016 | Hendry et al. | | |
| 2017/0171282 A1 | 6/2017 | Denoual et al. | | |
| 2018/0077210 A1 | 3/2018 | Hannuksela et al. | | |
| 2018/0152688 A1 | 5/2018 | Graziosi | | |
| 2019/0244412 A1 | 8/2019 | Yago Vicente et al. | | |
| 2019/0306519 A1 | 10/2019 | Chen et al. | | |
| 2020/0045290 A1* | 2/2020 | Ruhm | ............... | H04N 13/275 |
| 2020/0045292 A1* | 2/2020 | Boyce | ............... | H04N 13/178 |
| 2021/0006834 A1* | 1/2021 | Salahieh | ............ | H04N 19/597 |

FOREIGN PATENT DOCUMENTS

| | | | | | |
|---|---|---|---|---|---|
| KR | 2017-0113657 A | | 10/2017 | | |
| KR | 2019-0068622 A | | 6/2019 | | |
| KR | 10-2019-0105011 A | | 9/2019 | | |
| KR | 20200143287 A | * | 12/2020 | ......... | H04N 13/178 |
| WO | 2014107374 A3 | | 4/2015 | | |
| WO | WO-2018067733 A1 | * | 4/2018 | ......... | H04N 19/105 |
| WO | 2018130491 A1 | | 7/2018 | | |
| WO | 2018/177819 A1 | | 10/2018 | | |
| WO | WO-2021062289 A1 | * | 4/2021 | ......... | H04N 19/117 |

OTHER PUBLICATIONS

International Preliminary Report on Patentability issued in International Patent Application No. PCT/CN2019/122095, dated May 17, 2022, 4 pages.
Korean office action issued in KR Patent Application No. 10-2022-7020559, dated Aug. 17, 2023, 9 pages. English translation included.
European Search Report for EP Patent Application No. 19954380.2, dated Dec. 22, 2022, 8 pages.
Korean office action issued in corresponding KR Patent Application No. 10-2022-7020559, dated Feb. 22, 2023, 9 pages. English summary included.
Chinese office action issued in CN Patent Application No. 201980101328.3, dated Mar. 7, 2023, 18 pages. English translation included.
International Search Report and Written Opinion mailed on Aug. 26, 2020 for International Application No. PCT/CN2019/122095, filed on Nov. 29, 2019 (6 pages).
Japanese office action issued in JP Patent Application No. 2022-531493, dated Feb. 6, 2024, 17 pages. English translation included.
Korean notice of allowance issued in KR Patent Application No. 10-2022-7020559, dated Feb. 13, 2024, 8 pages. English translation included.
Chinese Notification to Complete Formalities of Registration issued in CN Patent Application No. 201980101328.3, dated Dec. 31, 2023, 4 pages. English translation included.

* cited by examiner

MULTI-VIEW VIDEO PROCESSING METHOD AND APPARATUS

CROSS-REFERENCE TO RELATED APPLICATIONS

This application is a continuation of International Patent Application No. PCT/CN2019/122095, filed on Nov. 29, 2019, the contents of which are incorporated herein by reference in their entirety.

TECHNICAL FIELD

This patent document relates generally to immersive technologies.

BACKGROUND

With the recent development of human-computer interaction and artificial intelligence technologies, immersive technology is revolutionizing the way we work and live. Immersive technology is applied in several areas, including marketing and advertising, healthcare, education, and gaming. The rapid development of new immersive technologies requires effectively processing video and image data.

SUMMARY

Disclosed are methods, devices and applications pertaining to representations of media data supporting 3DoF with additional limited translational movements (typically, head movements) along X, Y and Z axes, which effectively reduces the media content transmission and efficiently renders the immersive media content.

In an example embodiment of the disclosed technology, a method includes requesting, by a user, media files from a server according to the current viewing position, viewing direction and viewport of the user, receiving, by the user, the media files from the server according to the current viewing position, the viewing direction and viewport of the user, extracting patches of one or more atlases, and synthesizing the visual content in the current viewport of the user, and obtaining, by the user, three-dimensional stereoscopic video content in the current viewport of the user.

In another example embodiment of the disclosed technology, a method of constructing media content includes placing (or extracting) a plurality of media samples into (or from) a media file associated with a plurality of views including one or more basic views and one or more additional views such that each media sample corresponds to one or more of the plurality of views and includes at least one of a texture component or a depth component of the corresponding view, determining a basic view media track corresponding to the one or more basic views and one or more additional view media tracks such that each media track includes one or more indicators for describing information about the corresponding view, and constructing the media content from the plurality of media samples based on the one or more indicators by grouping the plurality of media samples into one or more sample groups each of which is associated with one basic view, or constructing the media content from the plurality of media samples based on the one or more indicators by grouping the multiple media tracks in which the plurality of media samples are placed.

In yet another example embodiment of the disclosed technology, a method of constructing media content includes placing (or extracting) a plurality of media samples into (or from) a media file associated with a plurality of views including a plurality of basic views and a plurality of additional views such that each media sample corresponds to one of the plurality of views and includes at least one of a texture component or a depth component associated with the corresponding view, determining a plurality of basic view media tracks corresponding to the plurality of basic views, respectively, and a plurality of additional view media tracks corresponding to the plurality of additional views, respectively, such that each media track includes one or more indicators for describing information about the corresponding view, and constructing the media content from the plurality of media samples based on the one or more indicators by grouping the plurality of media samples into one or more media sample groups each of which is associated with at least one basic view.

In yet another example embodiment of the disclosed technology, a method of constructing media content includes placing (or extracting), into (or from) a media file associated with a plurality of views, camera information including camera parameters corresponding to the plurality of views according to a viewing direction, a viewing position, and a viewing window, selecting, based on the camera parameter information, media metadata from the media file, and constructing the media content based on the media metadata.

Some embodiments may preferably implement these methods as follows:

The above methods, wherein a base view includes a view for predicting other views.

The above methods, wherein each basic view corresponds to a basic view atlas.

The above methods, wherein a patch is acquired based on the basic view atlas.

The above methods, wherein the media content is constructed based on a combination of one or more basic views and one or more additional views The above methods, wherein the one or more indicators include an indicator for grouping, into a sample group, the plurality of samples corresponding to atlases of two or more basic views.

The above methods, wherein the one or more indicators include an indicator for indicating whether each media track contains the texture component or the depth component or both.

The above methods, wherein the one or more indicators include an indicator for indicating whether each media track contains the texture component or the depth component or both.

The above methods, wherein the one or more indicators include an atlas attribute indicator to define which part of the texture component and the depth component is contained in the media track.

The above methods, wherein the one or more indicators include a view identifier to describe the corresponding view. In an implementation, each media track includes one or more views stored as an atlas mode.

The above methods, wherein the constructing of the media content includes combining patches from different views. In an implementation, an atlas contains an aggregation of one or more patches from one or more views.

The above methods, wherein the one or more indicators include an indicator describing the number of patches in each atlas.

The above methods, wherein the one or more indicators include a patch rotation indicator to a rotation angle at which a patch maps from atlas to corresponding view.

The above methods, wherein the one or more indicators include a file level grouping indicator to describe a grouping type to group different media tracks containing different views.

The above methods, wherein the file level grouping indicator includes grouping information between a basic view and one or more additional views.

The above methods, wherein the file level grouping indicator includes the number of entities in a group.

The above methods, wherein each media track includes an indicator for identify the plurality of views as a basic view or an additional view.

The above methods, wherein the camera information is extracted on a media file basis.

The above methods, wherein the camera information is extracted on a media track basis.

The above methods, wherein each of the plurality of media tracks is from a patch of the plurality of views, and wherein each view corresponds to one camera.

The above methods, wherein the plurality of views of the user includes at least one basic view and at least one additional view associated with the at least one basic view.

The above methods, wherein the media data of the at least one basic view is used as a base image of at least one additional view associated with the at least one basic view.

The above methods, wherein the plurality of views of the user includes two or more basic views stored in different media tracks, respectively.

The above methods, wherein the camera information includes a media track group to indicate that the media data in the media track group is to be used to decode images within a certain space range corresponding to the media track group.

In yet another example embodiment of the disclosed technology, the above-described methods are embodied in the form of processor-executable code and stored in a computer-readable program medium.

In yet another example embodiment of the disclosed technology, a device that is configured or operable to perform the above-described methods is disclosed.

The above and other aspects and their implementations are described in greater detail in the drawings, the descriptions, and the claims.

DETAILED DESCRIPTION

Immersive media enables users to experience a highly realistic virtual space environment through visual and audio experiences through audio and video technologies. At present, the immersive experience mainly supports panoramic video. For example, the user can watch the 360-degree video through the free rotation of the head through the head display device, that is, the three-degree-of-freedom (3DOF) immersive experience. For videos that support enhanced three-degree-of-freedom (3DOF plus) and partial six-degree-of-freedom (6DOF), the user's head can also move within a limited range, viewing more detail, such as occluded visual content.

Support for 3DOF plus video can be used through multiple cameras arranged in different shapes in a space to capture the original video, and then by algorithm synthesis of three-dimensional panoramic video, to meet the user's head in the immersive media limited movement. Based on multi-camera deployment, multi-view video typically has a large amount of redundant data, resulting in a waste of storage and computing resources. Currently, in the content production phase, it is possible to reduce redundancy by removing the visual content of overlapping parts of multiple views at the same time and represent stereo-video within the viewport by views with texture and depth components. When the user's terminal device receives the immersive media content, it needs to render the content according to the user's viewing position, viewing direction, acquisition device's properties and other information, especially for rendering in the process of moving, so as to ensure the best immersion experience for the user. At present, there is a lack of corresponding media expression for the media content of 3DOF plus, which will affect the effective rendering and playing back media content.

Figure 1:
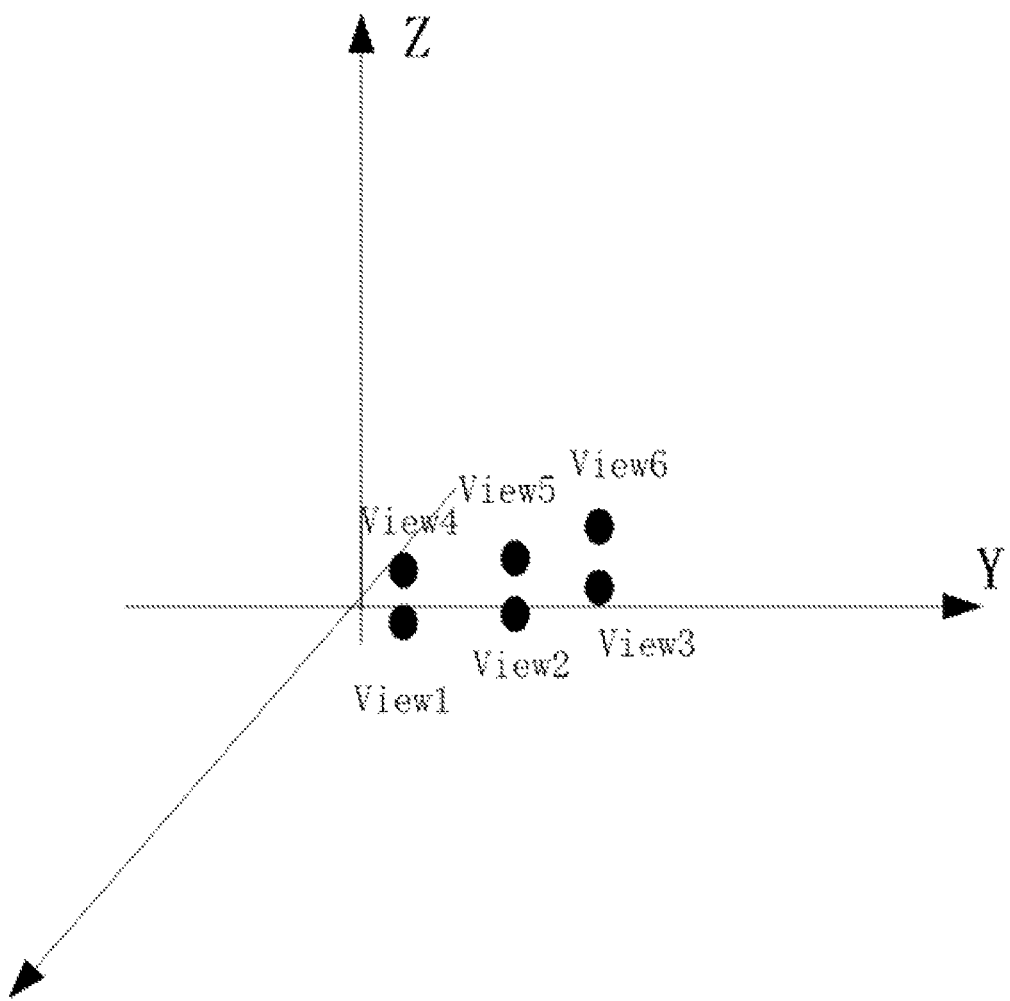
FIG. 1 is a diagram showing an example of content collection of 3DOF+ based on some embodiments of the disclosed technology.

FIG. 1 is a diagram showing an example of video capture of 3DOFplus based on some embodiments of the disclosed technology. In order to support the 3DOFplus scenario, multiple cameras are deployed in different locations in the space. For example, multiple cameras are arranged in parallel in a curved configuration or in a rectangular configuration, and images are simultaneously captured by the multiple cameras. Depending on the location and orientation of the camera deployment, the videos captured by different cameras can have similar content.

The contents collected from the multi-view videos are synthesized to produce three-dimensional panoramic videos. According to the similarity and difference of multi-view acquisition content, the user can move within a limited range in the process of viewing immersive media to see more details, such as occluded visual content.

Figure 2:
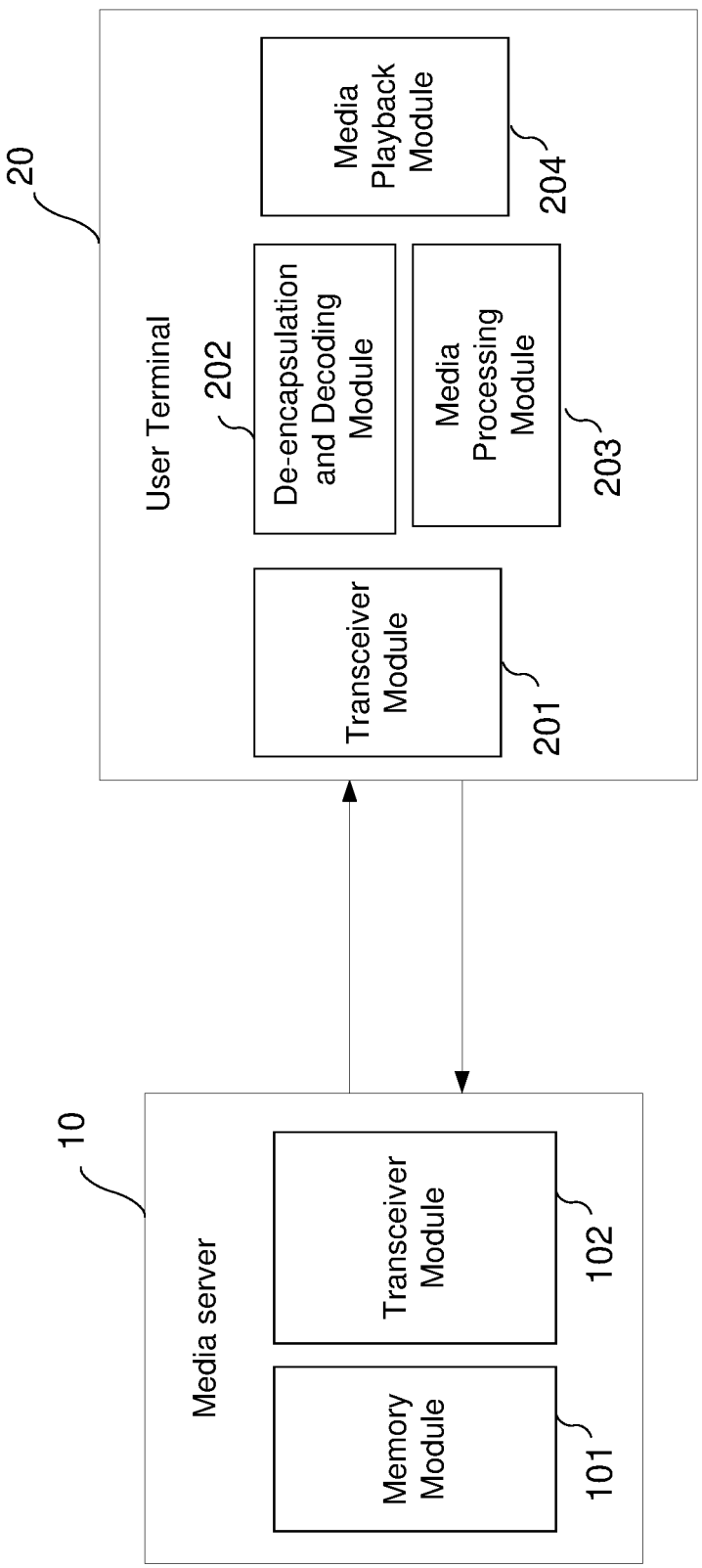
FIG. 2 is a diagram showing an example of a video data processing system based on some embodiments of the disclosed technology.

FIG. 2 is a diagram showing an example of a video data processing system based on some embodiments of the disclosed technology. In some embodiments of the disclosed technology, the video data processing system includes a media server 10 and a user terminal 20.

In some implementations, the media server 10 includes a memory module 101 to store media files and a transceiver module 102 to communicate with the user terminal 20. The memory module 101 is used to store media files. In some implementations, the transceiver module 102 is configured to receive a request message from the user terminal 20 and/or send the stored media files to the user terminal 20. In one example, the transceiver module 102 may receive the request message and transmit the media files through a wireless network and/or a wired network.

In some implementations, the user terminal 20 includes a transceiver module 201, a de-encapsulation and decoding module 202, a media processing module 203, and a media playback module 204. In some implementations, the transceiver module 201 is configured to receive the media files from the media server 10 and send requests such as media file requests to the media server 10. The de-encapsulation and decoding module 202 is used to unpack and decode the media files received by the transceiver module 201. In some implementations, the media processing module 203 performs video processing such as video synthesis and rendering on a set of atlases of multi-view decoded by the decoding module 202 according to the current viewing state of the user (e.g., the position of the user, the viewing direction, the viewport of the user). The media playback module 204 is used to play back visual content corresponding to the user's current viewing state.

Figure 3:
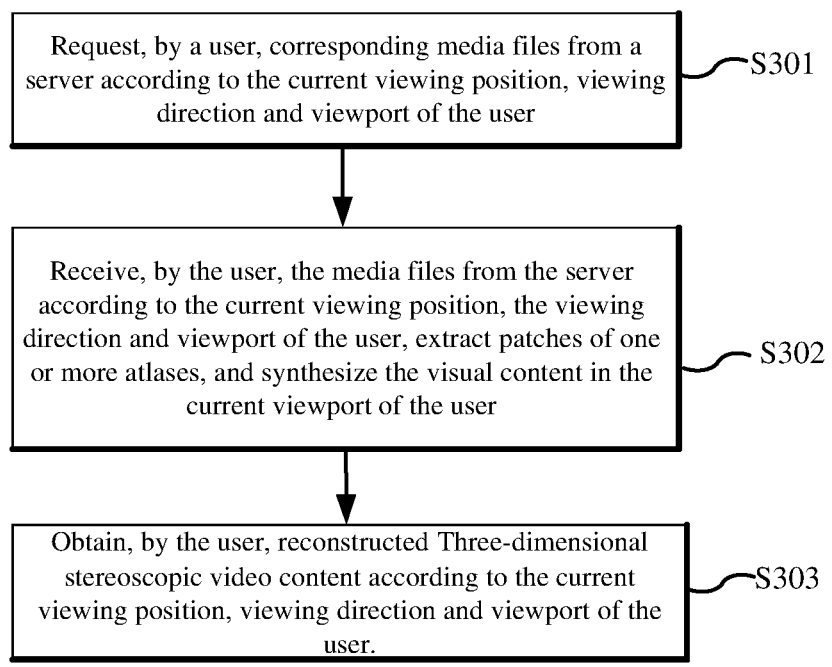
FIG. 3 is a flowchart showing an example of a video data processing method based on some embodiments of the disclosed technology.

FIG. 3 is a flowchart showing an example of a video data processing method based on some embodiments of the disclosed technology.

In some embodiments of the disclosed technology, the video data processing method includes, at step S301, requesting, by a user, media files from a server according to the current viewing position, viewing direction and viewport of the user. In one example, the request for the corresponding media files may include the user's real-time feedback to watch the view desired by the user. In one example, a media processing module implemented in the user terminal may use one or more sensors and associated signal processing devices to convert the user's real-time feedback into a user's request.

In some embodiments of the disclosed technology, the video data processing method includes, at step S302, receiving, by the user, the media files from the server according to the current viewing position, the viewing direction and the viewport of the user, extracting patches of one or more atlases according to the current viewing position, the viewing direction and the viewport of the user, and synthesizing the visual content in the current viewport of the user. In one example, the media processing module may reconstruct a video in the viewport of the user according to the real-time viewing position and direction of the user, and transmit the reconstructed video to a media playback module or a display terminal.

In some embodiments of the disclosed technology, the video data processing method includes, at step S303, obtaining, by the user, reconstructed three-dimensional stereoscopic video content according to the current viewing position, viewing direction and viewport of the user. In one example, the user uses the display terminal or the media playback module to view the reconstructed video.

In some embodiments of the disclosed technology, the video data processing method may be implemented to 3DOF plus video data in a file based on an ISO (International Organization for Standardization) basic media file format. The ISO basic media file format may include, among others, a restricted scheme information box, a track reference box, and a track group box, which are defined in the ISO/IEC JTC1/SC29/WG11 Moving Picture Experts Group (MPEG) MPEG-4. Part 12 ISO Base Media File Format. The projection, packaging steps and basic format of the omnidirectional video can be operated based on the MPEG-I Part 2 OMAF (omnidirectional media format) developed by the Moving Picture Experts Group (MPEG) of ISO/IEC JTC1/SC29/WG11.

In some embodiments of the disclosed technology, all the data in the ISO basic file format is contained in a box (Box). In one example, the ISO basic file format represented by mp4 files includes a plurality of boxes, each of which has a particular type and length and can be considered as a data object. A box can contain another box, called a container box. In one example, a "ftyp" type box is placed in the beginning of the file. In one example, the "ftyp" type box is used as a flag for indicating the file format and contains some information about the file.

In some embodiments of the disclosed technology, the "ftyp" type box is followed by "MOOV" type box, which is a container box with metadata information for the media. In an implementation, the media data for MP4 files is contained in one or more "mdat" type boxes, each of which is a container box. In another implementation, MP4 files do not contain such "mdat" type boxes when the media data refers to other files in its entirety. In some embodiments of the disclosed technology, the structure of the media data is described by metadata. In some implementations, for further metadata descriptions with respect to the media, MP4 files may contain a "meta" type box, which is also a container box that describes some generic or additional untimed metadata.

In some embodiments of the disclosed technology, a timed metadata track (e.g., mechanism in the ISO Basic Media File Format, ISOBMFF) is used to establish timed metadata associated with particular samples. Timing metadata is less coupled with media data and is usually descriptive.

Figure 4A:
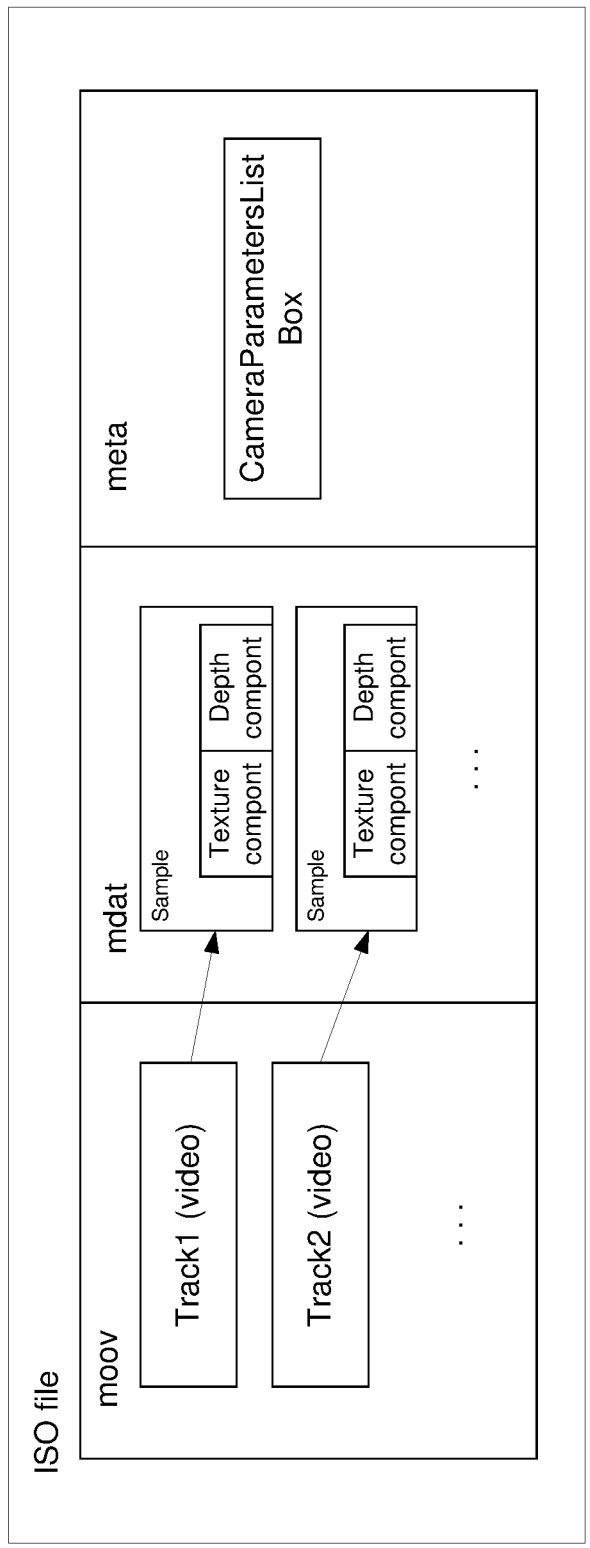
FIG. 4A is a diagram showing an example of a basic structure of a media file based on some embodiments of the disclosed technology.

FIG. 4A is a diagram showing an example of a basic structure of a media file where texture component and depth component of an atlas are placed into the same media track based on some embodiments of the disclosed technology.

Figure 4B:
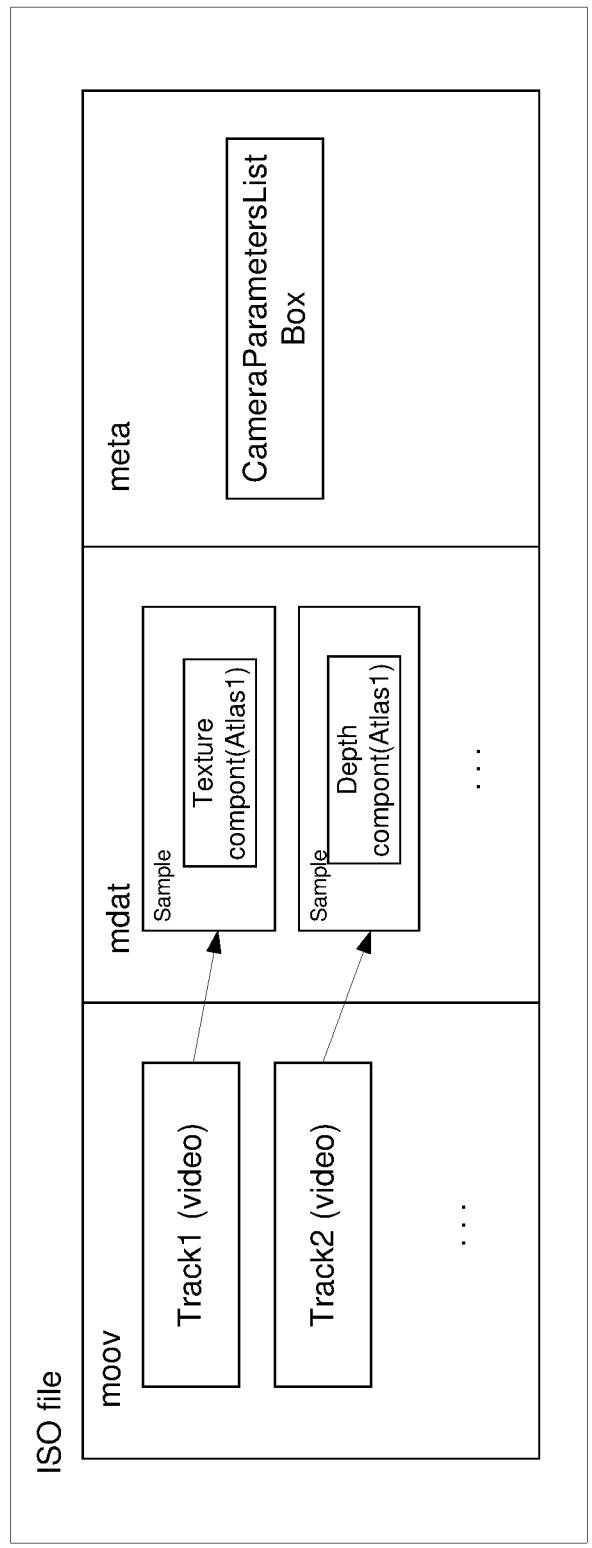
FIG. 4B is a diagram showing another example of the basic structure of the media file based on some embodiments of the disclosed technology.

FIG. 4B is a diagram showing another example of a basic structure of a media file where texture component and depth component of an atlas are placed into the different media tracks based on some embodiments of the disclosed technology.

In some embodiments of the disclosed technology, a plurality of views may be described by using a layered structure that includes a base layer and one or more additional layer. The media file may include one or more media tracks for describing media metadata of the plurality of views where one media track corresponds to one layer.

As shown in FIG. 4B, the view of the video may be represented by one or more atlases that are divided into texture components and depth components, and texture components and/or depth components are contained in one or more (e.g., 1 or 2) media tracks corresponding to an atlas. The atlas brings together patches from one or more views, either a complete view or a portion of a trimmed piece from a view. If the content, size and quantity of the patch change, the information regarding the patch is described using timed metadata.

In an implementation, static information related to a plurality of views such as a camera parameter list is described in a box in a media track or a box in a media file.

In another implementation, by defining a box as the "meta" type box to describe each camera one by one, each camera corresponds to each view.

In another implementation, in the case where the atlas in one media track is corresponding to one or more views, and the list of camera parameters corresponding to the views is described in the media track.

Each patch in the atlas is derived from a view of the video captured by the camera. According to the user's viewing position and viewing direction, the patch in the field of view of user is selected based on the properties of each patch described in the media track, such that the user can see the media content of current viewport by synthesizing one or more selected patches.

In some embodiments of the disclosed technology, the method for processing video data, characterized includes: determining one or more atlases in the one or more media tracks corresponding to the views of the multi-view video in the viewport selected by the user, wherein the one or more atlases include texture component and depth component of the one or more views; and generating a user to view the multi-view video in the viewport based on the atlases and cameras parameters for shooting the multi-view video.

In some embodiments of the disclosed technology, the determining of the one or more atlases in the one or more media tracks corresponding to the views of the multi-view video selected by the user includes determining a basic view of the multi-view video and one or more additional views related to the view of the multi-view video selected by the user; and based on the one or more atlases corresponding to the base view and the one or more additional views of the multi-view video in the media tracks, determining one or more atlases corresponding to the views of the multi-view video selected by the user in the media tracks.

Figure 5:
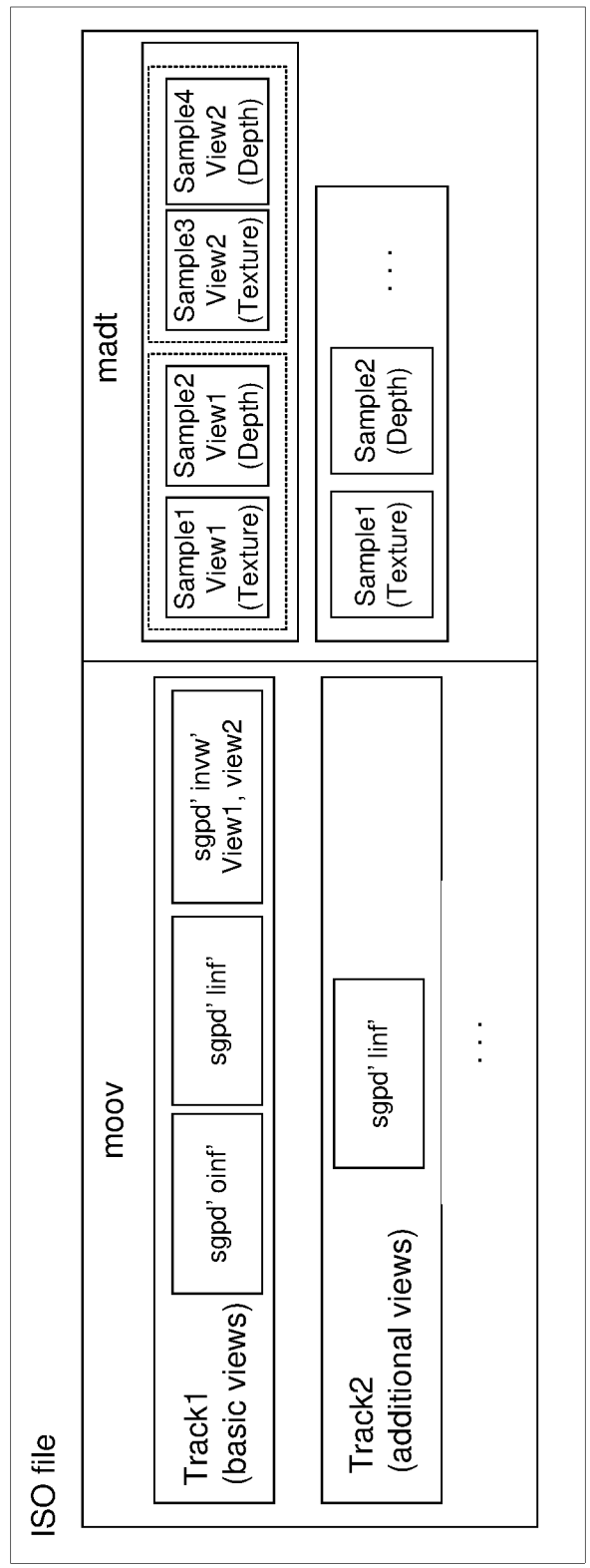
FIG. 5 is a diagram showing an example of multi-layer structure in media file based on some embodiments of the disclosed technology where only one media track includes one or more basic views.

FIG. 5 is a diagram showing an example of multi-layer structure in media file based on some embodiments of the disclosed technology where only one media track is a base layer contains one or more basic views.

In some embodiments of the disclosed technology, the correlation between different views can be used for view prediction. Views acquired by multiple cameras in the same space may have different degrees of correlation. For highly correlated views, the view can be used to predict its nearby view. For views with low correlation, however, the contents of the views are independent (or uncorrelation) and cannot be predicted from each other, while inter-frame predictions of basic views are possible.

In some embodiments of the disclosed technology, the media file includes media data associated with one or more basic views, and each basic view corresponds to an atlas. In that regard, the disclosed technology can be implemented in various embodiments to provide a hierarchical media description structure that defines a certain media track as the base layer, used to describe and store the one or more atlases corresponding to one or more basic views. The atlases corresponding to the other related additional views are described and stored in one or more other media tracks such as the media tracks of the additional layer, and the view of user viewport is synthesized from the combination of patches in atlases in the base layer and the additional layers.

Through the multi-layer atlas, three-dimensional panoramic video can be synthesized, allowing the user to see partially obscured visual content by changing the position and orientation of the head set.

In the media track of the base layer, a sample group of type "oinf" (operating points information) indicates the atlas of the basic view in the base layer, and the atlas of the view does not refer to other atlases, but it can be referenced by other atlases in the additional layers. In one or more media tracks corresponding to the additional layer including the atlases of additional views, a sample group with group type "oinf" may be referred to by a media track with media track reference type "oref."

There are multiple basic views in the media track of the base layer, grouping the samples based on different basic view, and defining the sample group type as "invw" indicating the grouping samples belongs to a basic view.

```
Box Type: 'sbgp'
Container: SampleTableBox or TrackFragmentBox
Mandatory:No
Quantity: Zero or more.
aligned(8) class SampleToGroupBox extends FullBox('sbgp',
version, 0){
unsigned int(32) grouping_type;
if (version == 1) {
unsigned int(32) grouping_type_parameter;
}
unsigned int(32) entry_count;
for (i=1; i <= entry_count; i++)
{
unsigned int(32) sample_count;
unsigned int(32) group_description_index;
}
}
```

The specific syntax is as follows:

"version" indicates the version of the box;

"grouping_type" indicates the type of the sample grouping and links it to its sample group description entry with the same value for grouping_type.

"grouping_type_parameter" indicates the subtype of the grouping;

"entry_count" indicates the number of sampling entries in the following table);

"sample_count" indicates the number of consecutive samples belonging to the same sample group; and "group_description_index" indicates the index of the sample group entry describing the samples in this group.

For grouping based on basic view-based samples, defining a sample group entry of type "bsvw" (basic view), and describing the identifier of the basic view that these samples in the group corresponding to, identifier of the camera corresponding to the basic view, and other additional views associated with the basic view are described.

As an example, these identifiers can be described as follows:

```
class BasicViewGroupEntry extends SampleGroupDescriptionEntry
('bsvw') {
    unsigned int (32) group_id;
    unsigned int (32) view_idx;
    unsigned int (32) camera_idx;
    unsigned int (8) num_ref_views;
  unsigned int (8) texture_or_depth_flag;
    for(int i=0; i< num_ref_views; i++){
    unsigned int (32) additional_view_idx;
    unsigned int (32) track_id;
  if(texture_or_depth_flag)
    unsigned int (32) depth_track_id;
    }
}
```

The syntax is defined as follows:

"group_id" indicates the group identifier to which the current sample belongs;

"view_idx" indicates a basic view index identifier corresponding to the current sample, that is, a view to which the sample corresponding;

"camera_idx" indicating a camera index identifier corresponding to the basic view;

"num_ref_views" indicates the number of other additional views that reference the set of basic view atlases;

"additional_view_idx" indicates the index identifier of an additional view associated with the basic view in the group;

"track_id" indicates the media track ID where the samples that the associated additional views corresponding to are located;

"texture_or_depth_flag" indicates whether the media track that contains the samples that associated additional views corresponding to includes texture component and/or depth component. When it equals to 0, includes both, when it equals to 1, only includes texture component;

"depth_track_id" indicates the media track ID where the depth component that the associated additional views corresponding to are located;

In some embodiments of the disclosed technology, the samples in the media track are atlases contain patches from one or more views. In one example, each view may correspond to one atlas. In another example, one or more views may correspond to one atlas. The atlas includes a texture component and a depth component. In an example hierarchical structure, the texture component and the depth component of an atlas may be respectively placed in two media tracks. In another example hierarchical structure, the texture component and the depth component of an atlas may be placed in the same media track. An "AtlasAttributeBox" describes which components of the atlas is contained in the media track.

```
Box type: 'atat'
Container: Scheme Information Box ('schi')
Mandatory (per an item): Yes, when scheme_type is equal to 'altv'
Quantity (per an item): one
aligned(8) class AtlasAttributeBox( ) extends FullBox('atat', 0, 0) {
unsigned int (8) texture_in_track;
unsigned int (8) depth_in_track;
unsigned int (8) atlas_id;
}
```

The syntax is defined as follows:

"texture_in_track" indicates whether the media track contains a texture component;

"depth_in_track" indicates whether the media track contains a depth component; and "atlas_id" indicates the identifier of the atlas which the texture component and/or depth component belongs to in the media track.

In an embodiment of the disclosed technology, when the texture component and the depth component of the atlas are placed in two media tracks, the two media tracks belong to one media track group, for example, the track 1 has the texture component of the atlas 1 and the track 2 has the depth component of the atlas 1 where the components of track 1 and track 2 belong to the same atlas. In one example, two media tracks belong to one media track group by defining a TrackGrouptypeBox which has the track_group_type is "atls," and the media track group is identified by "track_group_id," which may be the same as the atlas identification index (atlas_id) of the atlas.

In another embodiment of the disclosed technology, when both the texture and depth components are placed in a media track, the texture and depth component samples are grouped, and the type "texture and depth group" is defined as the texture and depth sample group that describes whether each sample belongs to the texture component or the depth component.

As an example, these identifiers can be described as follows:

```
class textureAnddepthGroupEntry extends SampleGroupDescriptionEntry
('tdpd') {
    bit(2) reserved = 0;
unsigned int (8) texture_or_depth;
    unsigned int (8) num_basicview_flag;
if(num_basicview_flag)
    unsigned int (8) group_id;
}
```

The specific syntax is defined as follows:

"texture_or_depth" indicates that the sample of the group is grouped into texture or depth components. When texture_or_depth is equal to 0, the sample is grouped into the texture component, and when texture_or_depth is equal to 1, the sample is grouped into the depth component; and "num_basicview_flag" indicates whether the samples in the media track corresponds to multiple basic views; when it is equal to 0, corresponds to only one basic view, and these samples are not grouping by basic view, when it is equal to 1, corresponding to more than two basic views.

"group_id," for the samples of multiple basic views in the media track, indicates the grouping identifier of sample group based on the basic views.

In some embodiments of the disclosed technology, the view identifier box (ViewIdentifierBox) defined in the ISO basic file format is "vwid" and describes the views contained in each media track, including the identity of the view, other reference views corresponding to the view, and so on. It can indicate whether the media track contains a texture component or a depth component, or both.

Based on the atlases, samples in the media tracks, the user selects the atlas in one or more media tracks according to the current viewing position, the viewing direction, and the viewport to synthesize the image that the user desires to view. The patches in the set are from video captured by one or more cameras corresponding to one or more views. In some implementations, the view to which each patch belongs and the position of each patch in the view are described to facilitate selection of the media track and its corresponding atlas. Define the parameters of the box to the atlas according to the ISO basic file format, optionally in one of the following ways.

In some embodiments of the disclosed technology, in each frame sample, the patches are collected from different views, and the position in the view is different and variable, and the patch information for all atlases is dynamically described by timed metadata.

An atlas information list is identified from the timed metadata track according to the sample entry type, and the atlas information list timed metadata track is used to indicate location information corresponding to each patch in the atlas and corresponding view and the corresponding view information.

Specifically, the purpose of the atlas information list timed metadata track is indicated by the track sample entry type, which is "atpl," as defined below.

```
AtlasParamsListSampleEntry extends MetaDataSampleEntry ('atpl'){
unsigned int(8) num_atlases;
unsigned int(8) num_views;
bit(7) reserved;
}
```

The specific syntax is defined as follows:

"num_atlases" indicates the number of atlases; and

"num_views" indicates the number of views.

Each sample in the timed metadata track is corresponding to information regarding all atlases at some point. The following example illustrates a sample format of the atlas information refers to the track sample entry type "atpl," above, and indicates the atlas information for each sample.

```
aligned(8) AtlasParamsSample( ){
for(i=0;i< num_atlases;i++){
unsigned int(8) atlas_id;
unsigned int(8) num_patches;
unsigned int(8) group_id;
    for(j=0;j< num_patches;j++){
unsigned int(8) view_id;
unsigned int(32) patch_width_in_view;
unsigned int(32) patch_height_in_view;
unsigned int(32) patch_pos_in_atlas_x;
unsigned int(32) patch_pos_in_atlas_y;
unsigned int(32) patch_pos_in_view_x;
unsigned int(32) patch_pos_in_view_y;
unsigned int(32) patch_rotation;
        }
      }
    }
```

The specific syntax is defined as follows:

"atlas_id" indicates the identifier of the atlas;

"num_patches" indicates the number of patches contained in the atlas;

"view_id" indicates a view identifier, which a patch belongs to;

"group_id" indicates the group identifier of the grouping based on a basic view and its associated additional views, when group_id is equal to 0, only one basic view, and the views does not need to be grouped;

"patch_width_in_view" and "patch_height_in_view" indicate the width and height of the patch in the luminance sample, respectively;

"patch_pos_in_atlas_x" and "patch_pos_in_atlas_y" indicate the coordinates of the X-axis and Y-axis in the atlas respectively "patch_pos_in_view_x" and "patch_pos_in_view_y" indicate the coordinates of the X-axis and the Y-axis of the patch in the luminance sampling, respectively; and "patch_rotation" indicates the rotation angle at which a patch maps from the atlas to the view. When patch_rotation is 0, it indicates there is no rotation, and when patch_rotation is 1, it indicates a clockwise 90-degree rotation, and other values greater than 1 are temporarily reserved.

In some embodiments of the disclosed technology, the atlas information describes the atlas place in the other media track, the timed metadata track defined above can link to one or more other media tracks by using the TrackReferenceBox with "cdsc" referenceType.

In some embodiments of the disclosed technology, the sample table box (SampleTableBox) includes a new defined box (Atlas Parameters Box) to indicate the atlas information of samples in the media track one by one.

Box Type: 'atlp'
Container: SampleTableBox
Mandatory: No
Quantity: Zero or one
```
aligned(8) class AtlasParametersBox extends FullBox('atlp', 0, 0) {
unsigned int(8) sample_count;
```

```
for (i=0; i < sample_count; i++) {
AtlasStruct( );
    }
  }
aligned(8) class AtlasStruct( ){
unsigned int(8) num_patches;
for(j=0;j< num_patches;j++){
unsigned int(8) view_id;
unsigned int(32) patch_width_in_view;
unsigned int(32) patch_height_in_view;
unsigned int(32) patch_pos_in_atlas_x;
unsigned int(32) patch_pos_in_atlas_y;
unsigned int(32) patch_pos_in_view_x;
unsigned int(32) patch_pos_in_view_y;
unsigned int(32) patch_rotation;
    }
  }
```

Figure 6:
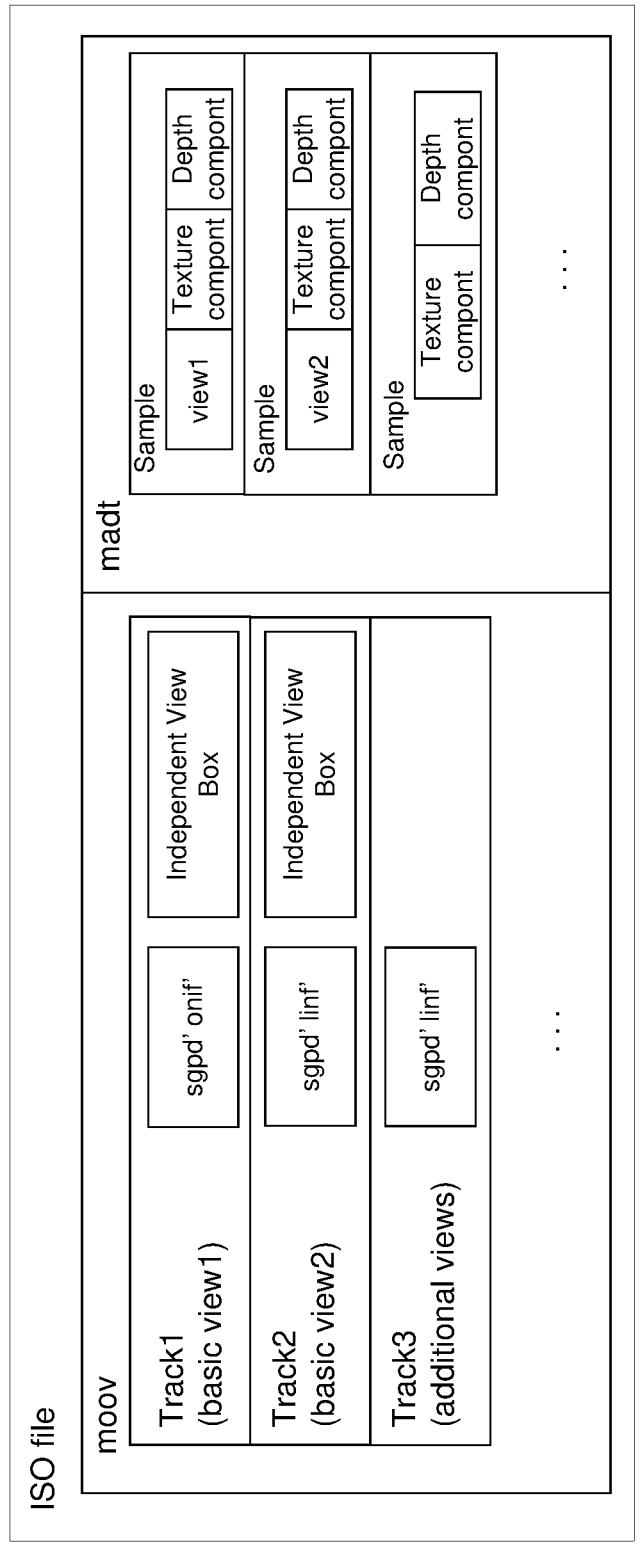
FIG. 6 is a diagram showing an example of a multi-layer track structure in media file based on some embodiments of the disclosed technology.

The specific syntax is defined as follows:

"sample_count" indicates the number of consecutive samples over a period of time;

"num_patches" indicates the number of patches included in the atlas;

"view_id" indicates the view identifier, which this patch belongs to;

"patch_width_in_view" and "patch_height_in_view" indicating the width and height of the patch in the luminance sample, respectively;

"patch_pos_in_atlas_x" and "patch_pos_in_atlas_y" indicates the coordinates of the X-axis and the Y-axis of the patch in the atlas, respectively;

"patch_pos_in_view_x" and "patch_pos_in_view_y" indicates that the coordinates of the X-axis and Y-axis in the luminance sample respectively; and "patch_rotation" indicates the angle of rotation of the patch from the atlas to the view image. When it is equal to 0, it indicates that there is no rotation; when it is equal to 1, it indicates a clockwise rotation of 90 degrees; other values greater than 1 are temporarily reserved FIG. 6 is a diagram showing an example of a multi-layer track structure in media file based on some embodiments of the disclosed technology where there are multiple basic views in the media file, and basic views can be used as a base view to predict other view. Based on the layered track description structure, a media track is defined as a base layer for storage of one basic view, and describes the operation point information of all basic views. The other basic view and the corresponding view of the additional view are stored in one or more other media tracks. Through the multiple views, a three-dimensional stereoscopic video can be synthesized, so that the user can see the partially occluded visual content through the displacement of the head.

The type "oinf" (operating points information) sample group in the media track of the base layer is defined to describe the operating points information in all basic views. All the additional layer media tracks refer to the base layer media track by referring to a media track type indicator "oref."

A basic view can be distinguished from other basic views and their associated additional views by including an indication at the media track level or at the file level.

In some embodiments of the disclosed technology, the distinction between basic and additional views is described at the media track level. In a media track that contains atlas belongs to a basic view, the media track is described as a media track that contains a basic view by defining a box of type 'invw' in the Media Information Box.

```
Box type: 'invw'
Container: MediaInformationBox
Mandatory: No
Quantity: Zero or one
    aligned(8) class BasicViewBox( ) extends fullBox('bavw', 0, 0) {
unsigned int(8) basic_view_idx;
unsigned int(8) camera_idx;
unsigned int (8) num_ref_views;
    unsigned int (8) texture_or_depth_flag;
for(int k=0; k< num_ref_views; k++){
    unsigned int (8) additional_view_idx;
    unsigned int (8)track_id;
    if(texture_or_depth_flag)
    unsigned int (32) depth_track_id;
    }
    }
```

The specific syntax is defined as follows:

"basic_view_idx" is an identifier of the basic view that its corresponding atlas in the media track;

"camera_idx" indicates an identifier of the camera corresponding to the basic view;

"additional_view_idx" indicates an identifier of an additional view that refers to the basic view; and "track id" indicates an identifier of the media track that contains the atlas corresponding to an additional view associated with the basic view;

"texture_or_depth_flag" indicates whether the media track that contains the samples associated with additional views corresponding to the samples includes texture component and/or depth component, if it is 0, includes both, if it is 1, only includes texture component; and "depth_track_id" indicates the media track ID where the depth component that the associated additional views corresponding to are located.

For atlases corresponding to basic views and its associated additional views referring to the basic views, a track group box with a track group type (track_group_type) of "cstg" is defined to describe the relationship between the atlases corresponding to basic views and its associated additional views.

In some embodiments of the disclosed technology, group descriptions are provided at the file level for the media tracks where the basic view is located, and for the media tracks having the additional view refer to the associated basic views.

Extending EntityToGroupBox is used in the ISO base file format to define a grouping type (grouping_type) as "asvw" (associated view group) to group media tracks containing atlases form associated views. The group members are described to distinguish the media track in which the basic view is located, and it can be said that the track contains texture components and/or depth components of the atlas. In one group, there is only one basic view in a media track, and other views are associated with the basic view.

```
Box Type: 'asvw'
Container: GroupsListBox
Mandatory: No
Quantity: One or more
    aligned(8) class AssociateViewsGroupBox('asvw', version, flags)
extends EntityToGroupBox (grouping_type, version, flags) {
    unsigned int(32) group_id;
    unsigned int(32) num_entities_in_group;
    for(i=0; i<num_entities_in_group; i++)
```

-continued

```
        unsigned int(32) entity_id;
        unsigned int(8) is_basic_view;
        unsigned int(8) is_texture_in_entity;
        unsigned int(8) is_depth_in_entity;
}
```

The syntax is as follows:

"group_id" indicates the group identifier for the grouping described in each box;

"num_entities_in_group" indicates the number of entities in the group; and

"entity_id" indicates the entity identifier of the media track in which the atlas that the belongs to is placed, equal to track_id;

"is_basic_view" indicates whether a group member media track in a group includes a basic view. When it equals to 1, a group member media track in a group contains a basic view, or when it is 0, a group member media track in a group does not contain a basic view, and only one group member has a value of 1;

"is_texture_in_entity" indicates whether the media track of a certain group member in the group contains the texture component of the atlas that the view belongs to; and "is_depth_in_entity" indicates whether the media track of a group member in a group contains the depth component of the atlas that the view belongs to.

In some implementations, the atlases of the multiple basic views are stored in separate bitstreams. For example, one bitstream contains only one atlas corresponding to one basic view and the atlas corresponding to other views associated with that basic view. In this case, a layered structure can still be used.

In some embodiments of the disclosed technology, after receiving the media stream file and decoding, the user selects the media content corresponding to the basic view and its associated additional view according to the user's viewing direction, viewing position, and viewport. The corresponding camera information are considered in the process to complete the rendering of the selected content.

In some embodiments of the disclosed technology, by defining a box that describes the information of the camera parameters, the camera for multiple views is described in detail.

In some embodiments of the disclosed technology, the camera parameter information is intrinsic information and position information, and the data box is defined at the file level for description. The camera parameter list box is identified according to the box type, and the camera parameters corresponding to all the patches in the media file are described, and the box is included in the "meta" type box.

```
Box type: 'capl'
Container: Meta Box ('meta')
Mandatory: No
Quantity: Zero or one
    aligned(8) class CameraParametersListBox( ) extends
FullBox('capl', 0, 0) {
    unsigned int(16) num_cameras;
    for(int i=0; i<num_cameras; i++){
    unsigned int(8) view_idx;
    CameraPosStruct( );
    RotationStruct( );
    ProjectionFormatStructEx( );
    DepthQuantizationStruct( );
    }
}
```

-continued

```
aligned(8) class CameraPosStruct( ) {
  unsigned int(32) camera_pos_x;
  unsigned int(32) camera_pos_y;
  unsigned int(32) camera_pos_z;
}
aligned(8) class ProjectionFormatStructEx( ) {
  bit(3) reserved = 0;
  unsigned int(5) projection_type;
  projection_plane_width;
  projection_plane_height;
  if (projection_type==0) {
    unsigned int(32) erp_phi_min;
    unsigned int(32) erp_phi_max;
    unsigned int(32) erp_theta_min;
    unsigned int(32) erp_theta_min;
  }
  if (projection_type==0) {
    cubic_map_type;
  }
  if (projection_type==2) {
    unsigned int(32) perspective_focal_hor;
    unsigned int(32) perspective_focal_ver;
    unsigned int(32) perspective_center_hor;
    unsigned int(32) perspective_center_ver;
  }
}
aligned(8) class DepthQuantizationStruct( ) {
  unsigned int(8) quantization_law;
  if (quantization_law == 0) {
    unsigned int(32) depth_near;
    unsigned int(32) depth_far;
  }
}
aligned(8) class RotationStruct( ) {
  signed int(32) rotation_yaw;
  signed int(32) rotation_pitch;
  signed int(32) rotation_roll;
}
```

The specific syntax is defined as follows:

"num_cameras" indicates the number of cameras;

"view_idx" is an identifier of the view captured by the camera, by which the camera corresponding to the view can be found;

"camera_pos_x," "camera_pos_y," and "camera_pos_z" indicates the position of the camera in the global reference coordinate system;

"projection_type" indicates the projection method of the camera. When it is equal to 0, the indication is ERP projection mode, and when it is equal to 1, the indication is CMP projection mode, and when it is equal to 2, the indication is perspective projection, and the value ranges from 0 to 255, of which 3 to 255 can be defined in the future as needed;

"projection_plane_width" and "projection_plane_height" indicate the horizontal and vertical resolutions of the camera projection plane, which are indicated by the horizontal and vertical resolutions of the encoded brightness sampling;

"erp_phi_min" and "erp_phi_max" indicate the latitude range (minimum and maximum) of the ERP projection;

"erp_theta_min" and "erp_theta_max" indicate the longitude range (minimum and maximum) of the ERP projection;

"perspective_focal_hor," "perspective_focal_ver," indicate; in luma sample position units the horizontal and vertical components, respectively, of the focal of a perspective projection;

"perspective_center_hor," and "perspective_center_ver" indicate in luma sample positions the horizontal and vertical coordinates, respectively, of the principal point of a perspective projection.

"quantization_law" indicates the type of depth quantization method of the camera;

"depth_near, depth_far" indicates the minimum and maximum normalized disparity values, respectively;

"cubic_map_type" indicates the type of CMP projection. When it is equal to 0, the indication is full projection mode (6 package faces); when it is greater than 0, it is temporarily reserved; and "rotation_yaw" and "rotation_pitch" and "rotation_roll" specify the yaw angle, pitch angle, and roll angle for the camera to rotate along the X, Y, and Z axes, respectively.

In some embodiments of the disclosed technology, each of the media tracks is from a patch of one or more views, and each view corresponds to one camera, and the camera corresponding to the view in each media track is described.

The camera parameter list box is identified according to the box type contained in the "schi" type box, which is the Scheme Information Box, describing the restricted scheme information, where the box is in the scheme type (when scheme_type is "altv," support atlas mode). Example of the Camera Parameters Box is described below.

```
Box type: 'acpl'
Container: Scheme Information Box ('schi')
Mandatory (per an item): Yes, when scheme_type is equal to 'altv'
Quantity (per an item): one
aligned(8) class AtlasCameraParametersListBox( ) extends
FullBox('acpl', 0, 0) {
  unsigned int(16) num_cameras;
  for(int i=0; i<num_cameras; i++){
    unsigned int(8) view_idx;
    CameraPosStruct( );
    RotationStruct( );
    ProjectionFormatStructEx( );
    DepthQuantizationStruct( );
  }
}
```

In some embodiments of the disclosed technology, there are two or more basic views based on the deployment mode of the camera, and the atlas of the basic view are stored in different media tracks, and the atlas of each basic view is used as the base view, and the view of the associated additional view serves as an additional view. In the media track where the basic view is located, the camera corresponding to the basic view and its associated other views can be described using the Atlas Camera Parameter Box (AltalsCameraParametersListBox), which is included in the "schi" type box, which is the solution information. The Scheme Information Box is used to describe restricted information. The media track in which the atlas of other related views is located defines the track with the track reference type "sbas" to associate the media track of the basic view with other media track of related additional views.

In some embodiments of the disclosed technology, media tracks associated with basic views and other views related to them may be defined using a track group type "cstg."

The disclosed technology can be implemented in some embodiments to put the atlas of views into media tracks in a situation where multiple basic views exist. In an implementation, the texture component and depth component are put into one media track, or in another implementation, the texture component and depth component are put into different media tracks. The multi-view video processing method implemented based on some embodiments of the disclosed technology may include defining the structure of media tracks and related metadata and describing the metadata of data and the atlas information of views put in the media tracks. The multi-view video processing method implemented based on some embodiments of the disclosed technology may include capturing video based on multiple views, coding the video, packing the coded video with its metadata into a media file, and sending the media file directly or according to user's selection. The user can accept the media file and extract the metadata and samples needed, decode pictures in the media file and synthesize the decoded pictures to see the synthesized content in his viewport.

In some embodiments of the disclosed technology, a video data processing method may include determining one or more atlases in a media track corresponding to views of a multi-viewpoint video in a viewpoint of the user. The one or more atlases include texture information and depth information of the views.

In some embodiments of the disclosed technology, the video data processing method may also include, based on the atlas and the camera parameters corresponding to the multi-view video, generating the multi-viewpoint video in the viewpoint of the user.

In some embodiments of the disclosed technology, the determining of the one or more atlases in the media track corresponding to the view of the multi-viewpoint video in the viewpoint of the user includes determining a base view of the multi-viewpoint video and an additional view related to the base view of the multi-viewpoint video selected by the user, and based on the atlas corresponding to the base view and the additional view of the multi-viewpoint video in the media track, determining one or more atlases corresponding to the view of the multi-view video selected by the user in the media track.

In one example, the determining of the one or more atlases in the media track corresponding to the view of the multi-viewpoint video in the viewpoint of the user further includes identifying an entity group data box in the media track based on a second group type, and the entity group data box indicates the base view of the multi-viewpoint video. In one example, the entity group data box indicates the group identification of the entity group.

In one example, the determining of the one or more atlases in the media track corresponding to the view of the multi-viewpoint video in the viewpoint of the user further includes identifying a basic view data box in the entry of the video track sample, and the basic view data box indicates the base view identification of the multi-view point video.

In some embodiments of the disclosed technology, a sample group data box is in the media track and its corresponding sample group description data box is identified based on a first group type, and the sample group entry in the sample group description data box indicates the multi-viewpoint video base view ID. In one example, the sample group entry indicates a grouping identifier of the sample group.

In some embodiments of the disclosed technology, the video data processing method further includes indicating the identifier of one or more additional views associated with the base view identifier of the multi-viewpoint video indicated in the sample group description data box or the entity group data box or a basic view data box. In one example, the video data processing method further includes using an identifier of the media track where the atlas corresponding to the view is located.

In some embodiments of the disclosed technology, the base view indicated by the basic view data box and the atlas corresponding to the additional view identified by the base view identifier of the multi-viewpoint video indicated by the basic view data box are located. In one example, the media track is characterized, according to the type of media track, by identifying the grouping of the media track in which a chart set corresponds to the base view and the media track in which the atlas corresponding to the additional view is located.

In some embodiments of the disclosed technology, an atlas list timed metadata track is identified according to the first sample entry type, and the atlas list timed metadata track is used to indicate image block information of the atlas in the media track.

In some embodiments of the disclosed technology, patch information of the atlas in the media track includes at least one of the following: the identification of the atlas; the number of patches of the atlas; the view identification of the patch source of the atlas; the width and height of the patch of the atlas in the view corresponding to the atlas; the coordinates of the patch in the atlas X-axis and Y-axis; the coordinates of the patch of the atlas in the view corresponding to the atlas of the X-axis and the Y-axis; the patches of the atlas are mapped from the atlas to the corresponding rotation angle of the view.

In some embodiments of the disclosed technology, the video data processing method further includes identifying an atlas attribute data box, which indicates whether the atlas contains texture information and/or depth information and indicates the identity of the atlas. Alternatively, a video track belonging to the texture information containing the atlas and a video track containing depth information of the atlas are identified based on a third track group type.

In some embodiments of the disclosed technology, the camera parameter may be used to identify a file-level camera parameter list data box and indicate camera parameter information for shooting the multi-viewpoint view. Alternatively, the atlas camera parameter list data box for identifying a restricted solution information is used to indicate the camera parameter information of the view corresponding to the atlas in the media track.

In some embodiments of the disclosed technology, the camera parameter may include at least one of the following: coordinate information for camera location; coordinate rotation information for camera location; camera mapping format information; camera depth quantification information.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of constructing media content, comprising:
placing a plurality of media samples into a media file associated with a plurality of views including one or more basic views and one or more additional views such that each media sample corresponds to one or more of the plurality of views and includes at least one of a texture component or a depth component of the corresponding view;
determining a basic view media track corresponding to the one or more basic views and one or more additional view media tracks such that each media track includes one or more indicators for describing information about the corresponding view; and
constructing the media content from the plurality of media samples based on the one or more indicators by grouping the plurality of media samples into one or more media sample groups each of which is associated with one basic view or by grouping a plurality of media tracks in which the plurality of media samples is placed,
wherein the media content is constructed using patches corresponding to one or more atlases of the one or more basic views and one or more atlases of the one or more additional views, wherein the one or more indicators include a first indicator for indicating the atlases of the one or more basic views, wherein the first indicator is located in the basic view media track, wherein the one or more atlases of the one or more basic views are determined by referring to the first indicator, and the one or more atlases of the one or more additional views are determined by referring to the one or more atlases of the one or more basic views.

2. The method of claim 1, wherein each basic view corresponds to a basic view atlas.

3. The method of claim 1, wherein the media content is constructed based on a combination of one or more basic views and one or more additional views.

4. The method of claim 1, wherein the one or more indicators include an indicator for indicating whether each media track contains the texture component or the depth component or both the texture component and the depth component.

5. The method of claim 1, wherein the one or more indicators include an atlas attribute indicator to define which part of the texture component and the depth component is contained in the media track.

6. The method of claim 1, wherein the one or more indicators include a view identifier to describe the corresponding view.

7. The method of claim 1, wherein the constructing of the media content includes combining patches from different media samples.

8. A method of constructing media content, comprising:
placing a plurality of media samples into a media file associated with a plurality of views including a plurality of basic views and a plurality of additional views such that each media sample corresponds to one of the plurality of views and includes at least one of a texture component or a depth component associated with the corresponding view;
determining a plurality of basic view media tracks corresponding to the plurality of basic views, respectively, and a plurality of additional view media tracks corresponding to the plurality of additional views, respectively, such that each media track includes one or more indicators for describing information about the corresponding view; and
constructing the media content from the plurality of media samples based on the one or more indicators by grouping the plurality of media samples into one or more media sample group each of which is associated with at least one basic view,
wherein the media content is constructed using patches corresponding to one or more atlases of the plurality of basic views and one or more atlases of the plurality of additional views, wherein the one or more indicators include a first indicator for indicating the atlases of the plurality of basic views, wherein the first indicator is located in the plurality of basic view media tracks, wherein the one or more atlases of the plurality of basic views are determined by referring to the first indicator, and the one or more atlases of the plurality of additional views are determined by referring to the one or more atlases of the plurality of basic views.

9. The method of claim 8, wherein an image acquired based on one or more basic views is used as a base image for predicting other images.

10. The method of claim 9, wherein each basic view corresponds to a basic view atlas.

11. The method of claim 10, wherein the image is acquired based on the basic view atlas.

12. The method of claim 8, wherein the one or more indicators include an entity level grouping indicator to describe a grouping type to group different media tracks containing different views.

13. The method of claim 8, wherein each media track includes an indicator for identify the plurality of views as a basic view or an additional view.

14. A method of constructing media content, comprising:
  placing, into a media file associated with a plurality of views, camera information including camera parameters corresponding to the plurality of views according to a viewing direction, a viewing position, and a viewing window;
  selecting, based on the camera parameter information, media metadata from the media file; and
  constructing the media content based on the media metadata,
  wherein the media metadata is described by one or more media tracks including one or more basic view media tracks corresponding to one or more basic views and one or more additional view media tracks corresponding to one or more additional views, wherein the media content is constructed using patches corresponding to one or more atlases of the one or more basic views and one or more atlases of the one or more additional views, wherein the one or more basic view media tracks include a first indicator for indicating the atlases of the one or more basic views, wherein the one or more atlases of the one or more basic views are determined by referring to the first indicator, and the one or more atlases of the one or more additional views are determined by referring to the one or more atlases of the one or more basic views.

15. The method of claim 14, wherein the camera information is extracted on a media file basis.

16. The method of claim 14, wherein the camera information is extracted on a media track basis.

17. The method of claim 14, wherein each of a plurality of media tracks is from a patch of the plurality of views, and wherein each view corresponds to one camera.

18. The method of claim 14, wherein the plurality of views includes at least one basic view and at least one additional view associated with the at least one basic view.

19. The method of claim 14, wherein the plurality of views includes two or more basic views stored in different media tracks, respectively.

20. The method of claim 14, wherein the camera information includes a media track group to indicate that media data in the media track group is to be used to decode images within a certain space range corresponding to the media track group.

* * * * *